US010183261B2

(12) United States Patent
Stefanoni

(10) Patent No.: US 10,183,261 B2
(45) Date of Patent: Jan. 22, 2019

(54) DEVICE FOR PREPARING AN EMULSIFIED HOT BEVERAGE

(71) Applicant: Ides Development Company Limited, Kowloon (HK)

(72) Inventor: Roberto Stefanoni, Oggiono LC (IT)

(73) Assignee: IDES DEVELOPMENT COMPANY LIMITED, Hong Kong (HK)

( * ) Notice: Subject to any disclaimer, the term of this patent is extended or adjusted under 35 U.S.C. 154(b) by 308 days.

(21) Appl. No.: 15/109,284

(22) PCT Filed: Oct. 27, 2014

(86) PCT No.: PCT/IB2014/006541
§ 371 (c)(1),
(2) Date: Jun. 30, 2016

(87) PCT Pub. No.: WO2015/068078
PCT Pub. Date: May 14, 2015

(65) Prior Publication Data
US 2016/0354735 A1 Dec. 8, 2016

(30) Foreign Application Priority Data

Nov. 11, 2013 (IT) .............................. RM2013A0619

(51) Int. Cl.
*A47J 43/044* (2006.01)
*B01F 3/08* (2006.01)
(Continued)

(52) U.S. Cl.
CPC ........... *B01F 3/0807* (2013.01); *A47J 27/004* (2013.01); *A47J 31/4407* (2013.01); *A47J 36/10* (2013.01);
(Continued)

(58) Field of Classification Search
CPC ....... A47J 27/004; A47J 43/044; B65D 11/00; B65D 11/01
(Continued)

(56) References Cited

U.S. PATENT DOCUMENTS 432,315 A * 7/1890 Fisk .............................. 220/4.28
8,747,933 B1 * 6/2014 McGinn .................. A47J 27/08
220/319
(Continued)

FOREIGN PATENT DOCUMENTS

DE 102006005975 A1 8/2007
WO 2008/142154 A1 11/2008
(Continued)

OTHER PUBLICATIONS

International Search Report and Written Opinion for International Application No. PCT/IB2014/065641 (dated Jan. 26, 2015) (9 pages).

*Primary Examiner* — Reginald L Alexander
(74) *Attorney, Agent, or Firm* — Lucas & Mercanti, LLP

(57) ABSTRACT

A milk-whipping device is disclosed. The device includes a heating base, a cylindrical container for the milk which rests on the base and which has a thermal exchange, a sealing closing flange, an impeller inserted in the container to produce an emulsifying effect on the milk; and a pair of connecting arms which can be snap-actuated. The connecting arms are revolvingly constrained to the base and extend along the lateral skirt of the container until hooking onto the closing flange.

15 Claims, 3 Drawing Sheets

(51) Int. Cl.
*A47J 27/00* (2006.01)
*A47J 36/10* (2006.01)
*A47J 43/046* (2006.01)
*B01F 7/00* (2006.01)
*B01F 13/08* (2006.01)
*B01F 15/00* (2006.01)
*B01F 15/06* (2006.01)
*A47J 31/44* (2006.01)
*B01F 7/22* (2006.01)

(52) U.S. Cl.
CPC ....... *A47J 43/0465* (2013.01); *B01F 7/00558* (2013.01); *B01F 7/22* (2013.01); *B01F 13/0827* (2013.01); *B01F 15/00006* (2013.01); *B01F 15/065* (2013.01); *A47J 43/044* (2013.01); *B01F 2015/062* (2013.01); *B01F 2215/0006* (2013.01); *B01F 2215/0022* (2013.01)

(58) Field of Classification Search
USPC .... 99/323.1, 348, 337; 220/4.16, 4.26, 4.28, 220/4.33; 261/84, DIG. 16, DIG. 26; 366/146, 282, 325.6, 343
See application file for complete search history.

(56) References Cited

U.S. PATENT DOCUMENTS

| | | | |
|---|---|---|---|
| 2008/0078824 A1* | 4/2008 | Spriegel | B65D 81/3876 229/403 |
| 2012/0000372 A1* | 1/2012 | Vanni | A47J 31/4489 99/323.1 |
| 2012/0007260 A1* | 1/2012 | Lin | A47J 36/165 261/142 |

FOREIGN PATENT DOCUMENTS

| | | |
|---|---|---|
| WO | 2011/090370 A1 | 7/2011 |
| WO | 2011/142661 A1 | 11/2011 |

* cited by examiner

DEVICE FOR PREPARING AN EMULSIFIED HOT BEVERAGE

CROSS-REFERENCE TO RELATED APPLICATIONS

This application is a 371 of PCT/IB2014/065641, filed Oct. 27, 2014, which claims the benefit of Italian Patent Application No. RM2013A000619, filed Nov. 11, 2013.

TECHNICAL FIELD OF THE INVENTION

The present invention relates to a device for the preparation of an emulsified hot beverage, typically a milk-based beverage such as for example a cappuccino, a chocolate, a simple hot milk or other.

BACKGROUND

Several devices for the preparation of hot, milk-based beverages of the type mentioned above are known. Such devices sometimes are provided as accessories of machines for the preparation of coffee starting from a preparation for example under the form of infusion.

Some of the known devices provide a heating base whereon a container is rested which receives the base-beverage, for example milk or water with infusions. Such devices generally comprise a stirring element which stirs the preparation existing in the container, favouring the incorporation of air in the beverage and thus producing an emulsifying effect. Therefore, the beverage can assume the consistence of a "cream" enhancing the taste thereof. Thanks to such emulsifying effect, the known devices are often called "milk-whipping" devices.

The inventor has found that the "milk-whipping" devices available on the market sometimes result to be uncomfortable to be used. For example, if the container of the beverage is hit accidentally while it is resting on the heating base, it can pour out its own content, the latter sometimes very hot.

Furthermore, the heat-transmitting modes between base and container can result to be not optimum, especially after a repeated use which tends to deform the walls in contact, with a decrease of the surface useful to the thermal exchange.

Still, the fixed portion of the stirring element does not result to be retained with sufficient stability with respect to the container. Consequently, the stirring element tends to vibrate, to the detriment of the mechanical integrity thereof. For these reasons, even the emulsifying action can result to be less effective.

SUMMARY OF THE INVENTION

The technical problem placed and solved by the present invention is then to provide a device for the preparation of an emulsified hot beverage allowing to obviate the drawbacks mentioned above with reference to the known art.

Such problem is solved by a device according to claim 1.

Preferred features of the present invention are subject of the depending claims.

The device of the invention mainly comprises: a heating base; a container of the beverage suitable to be rested on the base; a closing element, or lid, of the container, arranged removably at a mouth of the container itself; and an impeller suitable to produce an emulsifying effect in the beverage received in the container. According to the invention, the container further comprises at least a connecting arm, preferably a pair of side arms extending, in use, along a lateral skirt of the container between the base and the closing element. The arm(s) are configured to retain mutually juxtaposed the heating base, the container and the closing element. In particular, the arm(s) are configured to exert a compression force, or pressure, between base, container and lid, which force is suitable to keep the latter mutually juxtaposed in substantially vertical direction.

The connecting arm(s) can be revolvingly constrained to the heating base or to the closing element and suitable for the hooking or interlocking engagement—preferably at or near its own shaped end—the heating base or closing element, respectively.

The device of the invention allows an optimum heat transfer from a heating base to a container of the beverage.

The device further guarantees a firm retention of the container on the heating base. Still, the device allows the stirring element to act in optimum way thanks to the connection stability of the latter to the container.

Other advantages, features and use modes of the present invention will result evident from the following detailed description of some embodiments, shown by way of example and not with limitative purpose.

BRIEF DESCRIPTION OF THE FIGURES

The figures of the enclosed drawings will be referred to, wherein.

DETAILED DESCRIPTION OF PREFERRED EMBODIMENTS

Figure 1:
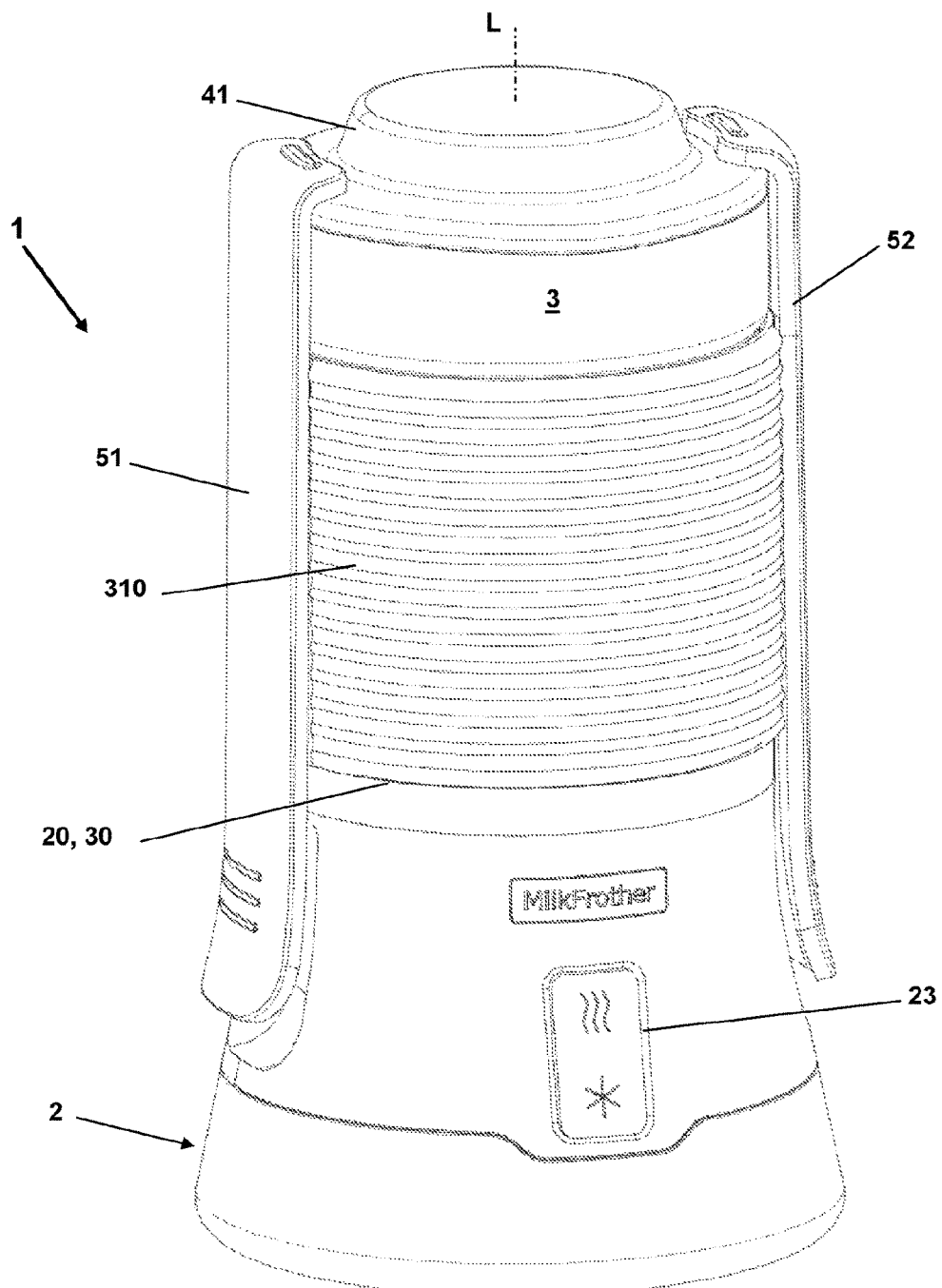
FIG. 1 shows a front perspective view of a preferred embodiment of the device according to the present invention.
Figure 2:
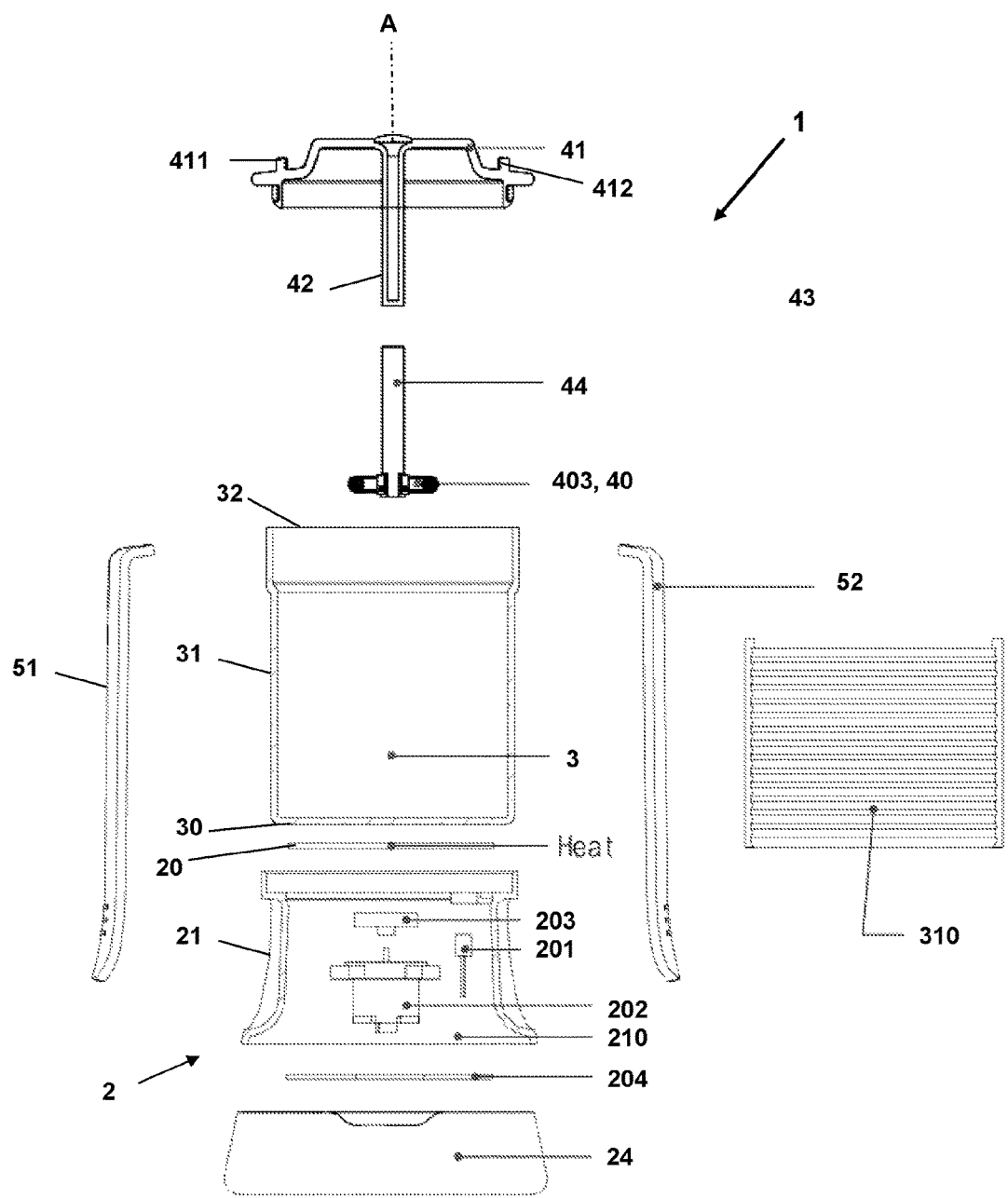
FIG. 2 shows an exploded view of the device of FIG. 1.

By firstly referring to FIGS. 1 and 2, a device for the preparation of an emulsified hot beverage according to a preferred embodiment of the invention is designated as a whole with 1.

In the present example, the device 1 is particularly suitable to the preparation of emulsified hot milk and for this reason it can eve be defined a "milk-whipping" device. As said above, however, the device 1, more generally, is suitable to the preparation of emulsified hot beverages which can include different ingredients as addition to or as replacement of milk.

Still in the present embodiment, the device 1 is of "stand-alone" type, in the sense that it can be used autonomously, independently from the association with other machines or devices. Furthermore, advantageously in the present example the device 1 is of portable type.

Embodiment variants can provide a permanent or removable connection of the device 1 to a machine for the preparation of beverages, for example of infusion type and obtained starting from a typically disposable capsule or pod.

The device 1 first of all comprises a heating base 2, incorporating means for producing heat, typically an electric resistor or equivalent means, of known type. Furthermore, a so-called NTC ("Negative Temperature Coefficient") thermistor 201 can be provided, which is used, in particular by means of an electronic interface, to control the temperature generated by the above-mentioned heat-generating means. The generated heat is made available at an upper surface 20 of the base 2.

In the present example, the heating base 2 further comprises motor means of an impeller 40 which will be illustrated hereinafter. In particular, such motor means is based upon a motor 202, for example an electric mini-motor which puts into rotation a first magnet 203, by producing an induction effect on said impeller 40.

The base 2 can further comprise means for controlling motor means and/or heat-generating means, which in the present example are represented under the form of printed circuit or PCB, 204.

The motor means, the heating means and the control means are housed into an inner compartment 210 defined by a casing 21 of the base 2, closed on the lower side by a base covering 24.

Actuating means 23, for example a button and/or a different and in case more articulated user interface can be provided on the heating base 2.

Upon use, a container 3 for the beverage to be emulsified, is rested on the surface 20. The container 3 indeed has a lower surface of thermal exchange 30 suitable to couple thermally with the upper surface 20 of the base 2 so as to implement a thermal exchange by conduction.

The container 3 preferably appears under the form of a carafe, cup or the like bearing an upper mouth 32, therefrom it is possible consuming directly the end beverage or pouring the latter in a glass, cup or other. In the present example, the heat exchange surface 30 corresponds to a base of the container 3. The latter further has a lateral skirt 31.

The container 3, in the present example, provides an oblong shape, with longitudinal axis L, and in particular an overall cylindrical geometry. Still in the present example, the axis L even corresponds to a longitudinal axis of the whole device 1.

In the present embodiment, at the lateral skirt 31 a coupling shaped, in particular knurled or grooved, profile 310 is obtained or applied. For example, such profile 310 can be obtained on a covering element, in particular made of rubber, applied onto the main body of the container 3.

The device 1 then comprises a closing element 41, in particular a plug or cover, of the container 3. The closing element 41, upon use, is arranged on opposite side with respect to the heat exchange surface 30. In the present example, the element 41 is shaped like a flange suitable to sealing the upper mouth 32 of the container 3.

The device 1 then comprises stirring means, based on the already mentioned impeller 40, which in the present example is under the form of helical spring wound like a circle.

The impeller 40 is integral to a second magnet 403, which in turn can be dragged into rotation by the induction produced by the first magnet 203 housed into the base 2.

The impeller 40, upon use, is inserted within the container 3 through the mouth 32 of the latter.

The impeller 40 is suitable to produce an emulsifying effect in the beverage received within the container 3.

In the present example, the impeller 40 and the magnet 403 are revolvingly mounted with respect to a stem 42 integral to the closing element 41 and preferably obtained together with the latter by moulding. Impeller 40 and magnet 403 are portions of an accessory bearing an additional stem or sleeve 44, preferably being revolvingly mounted on the latter. The stem or sleeve 44 can be connected to the stem 42 of the closing element 41 for example by means of an engagement of bayonet, screw or similar type and in case in a removable way. Such configuration has economical and easy functioning advantages, as well as cleaning advantages, in particular when it has no sharp corners difficult to be accessed.

The impeller 40 has an axis of rotation A corresponding to the prevalent extension direction of the stem 42 and preferably substantially coincident with the longitudinal axis L of the container 3 and/or of the device 1.

In the present example, the axis L and the axis A, upon use, are substantially vertical.

In an embodiment variant, the impeller 40 can be made integral to the closing element 41 in removable way, i.e. fixed therein, by means of a tight elastic system obtained in the same closing element 41. Such system can be constituted for example by elastically deformable means with tubular shape or however so as to define a seat wherein a stem of the impeller can be inserted and retained by elastic contract force.

The possibility of the stem to be removed from the impeller allows an extreme ease in performing and cleaning.

According to the invention, the device 1 then comprises a pair of connecting arms, designated with 51 and 52, respectively. Each arm 51, 52 preferably can be snap-actuated, according to the modes which will be illustrated shortly.

Each arm 51, 52, upon use, extends along the lateral skirt 31 of the container 3, substantially parallelly to the axis L, between the heating base 2 and the closing element 41.

Figure 3:
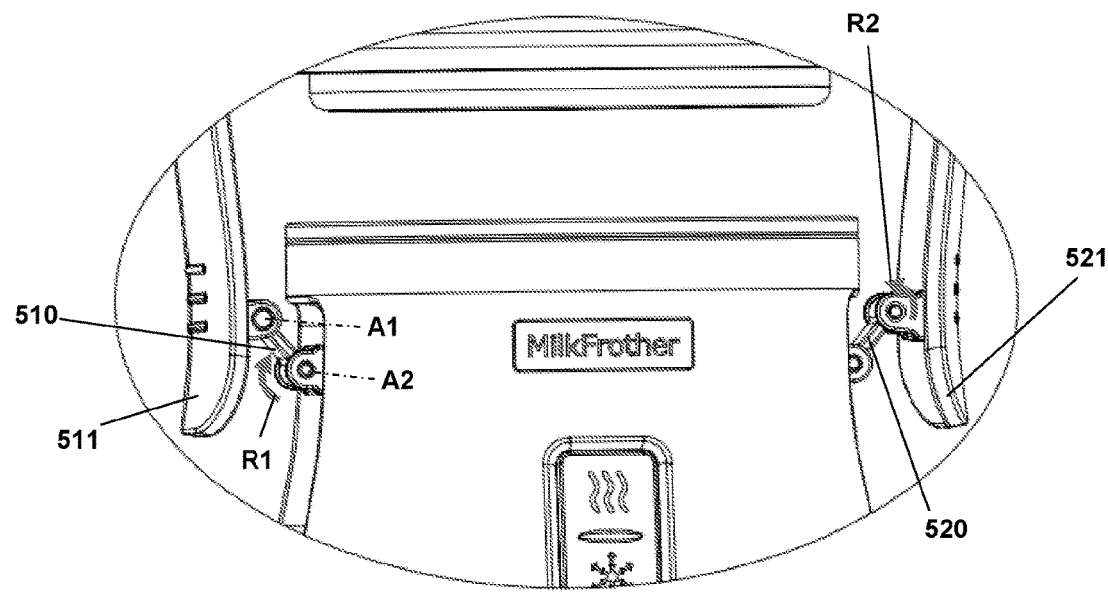
FIG. 3 shows a perspective view of a detail of the device of FIG. 1 related to a heating base of the latter.

As it is better visible in FIG. 3, each arm 51, 52 is constrained, in particular revolvingly, to the base 2 at its own first longitudinal end, designated for example with 511 for the arm 51 and with 521 for the arm 52. Such fastening preferably is under the form of an articulated coupling, which in the present example is based, for each arm 51, 52, on a lever 510, 520 revolvingly connected at its own end to the end 511, 521 of the respective arm 51, 52 and at the other end to the heating base 2. Such revolving connections between each lever 510, 520, respective arm 51, 52 and base 2 are implemented according to a pair of axes substantially horizontal and/or orthogonal to the axis L and designated with A1 and A2, respectively.

Figure 4:
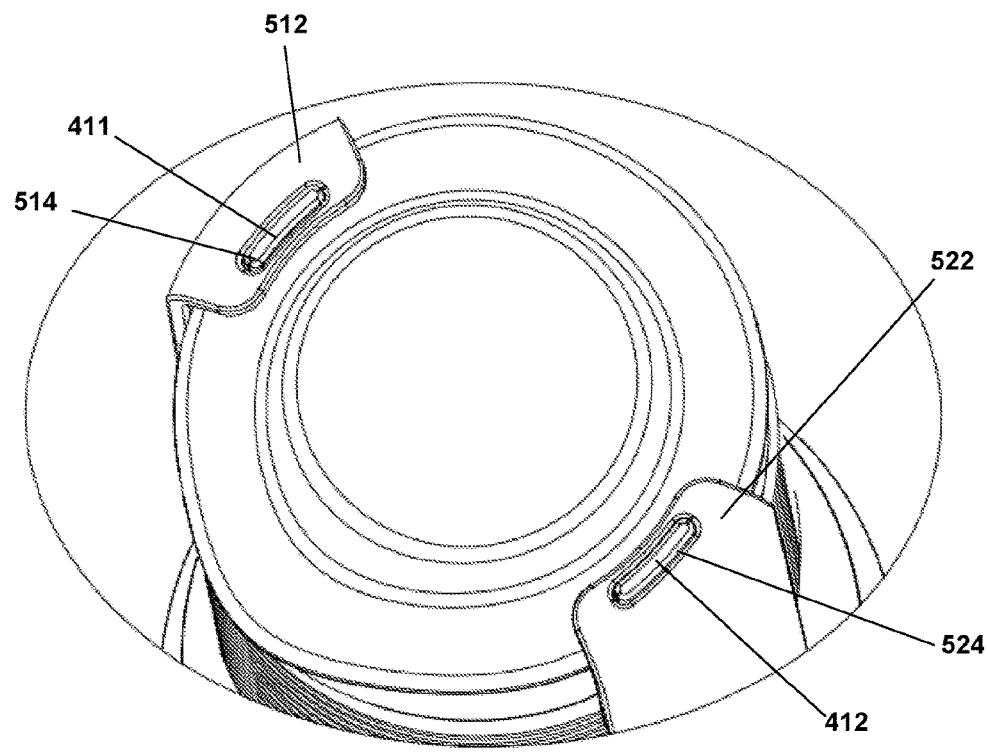
FIG. 4 shows a perspective view of another detail of the device of FIG. 1 related to the connection between a container, the above-mentioned heating base and a stirring element of the device itself.

As it is better visible in FIG. 4, each arm 51, 52 then, at or near its own second longitudinal end designated with 512 for the arm 51 and with 522 for the arm 52, bears a shaped conformation to engage the closing element 41. In the present example, such engagement is of interlocking or hooking type. In particular, it is obtained, for each arm 51, 52, by means of engaging a respective projecting element 411, 412, for example under the form of pin or peg, of the closing element 41 within a respective seat or hole 514, 524 of the arm 51, 52. In the present embodiment, the engagement elements 411 and 412 and the seats 514 and 524 have a shape with oblong cross-section.

The arms 51 and 52 act bilaterally to retain mutually juxtaposed the heating base 2, the container 3 and the closing element 41 during the operation of the device 1.

In particular, upon use the container 3 is filled-up with a beverage to be heated and emulsified and rested on the heating base 2. This shape, wherein the arms 51 and 52 are disengaged from the closing element 41, is shown in FIG. 3.

At this point, the closing element 41 bearing integrally the stem 42 is inserted on the container 3 as far as the closing element 41 abuts at the mouth 32.

Therefore, the arms 51 and 52 are actuated by rotating the joints at the end of the levers 510 and 520 in the direction of the arrows R1 and R2 to allow the elements 411 and 412 to pre-arrange to the engagement of the respective seats 514 and 524. At this point, a rotation of the levers 510 and 520 in the opposite direction produces the above-mentioned engagement between elements 411 and 412 and respective seats 514 and 524 and a snap-lock of the arms 51 and 52, abutting laterally on the base 2 and on the lateral skirt 31 of the container 3. Such configuration is shown in FIG. 1 and in FIG. 4.

The coupling profile 310 favours the abutment of the arms 51 and 52 on the lateral skirt 31 of the container 3.

Preferably, each lever 510, 520, at its own end articulated on the base 2, has a shaped profile, for example of cam type which, forced to rotate in the opposite direction with respect to that of the arrows R1 and R2, produces a temporary elastic deformation of the local wall of the base 2 and/or of the lever itself, by guaranteeing the retention of the arms 51 and 52 in the above-mentioned locking position. Such locking position can even correspond to a critical point of the articulated mechanism.

It will be appreciated that the container 3, the base 2 and the closing element 41 are implemented as distinct components, which can be removably associated upon use.

The device 1, for the heating means, can provide motor means and/or control means, a power supply from outer network or autonomous, common or separated, power supply means, for example of battery type.

A simplified embodiment variant can provide one single connecting arm having configuration and features conform to those described above for each one of the two arms 51 and 52.

Furthermore, based upon an embodiment variant the arm(s) are constrained, preferably revolvingly, to the container 3 or to the closing element 41 instead of the base 4.

The present invention has been sofar described by referring to preferred embodiments. It is to be meant that other embodiments belonging to the same inventive core may exist, as defined by the protection scope of the herebelow reported claims.

The invention claimed is:

1. A device for the preparation of an emulsified hot beverage, in particular a milk-based beverage, comprising:
    a heating base;
    a container of the emulsified hot beverage, configured to be removably supported upon said heating base, a bottom heat exchange surface of the container being rested upon an upper surface of the heating base, the bottom heat surface of the container and the upper surface of the heating base being configured to couple thermally with each other so as to implement a thermal exchange by conduction;
    a closing element of said container, configured to be removably arranged at a mouth of said container;
    an impeller, inserted or insertable in said container and configured to produce an emulsifying effect in the beverage,
    a connecting arm, which connecting arm extends, in use, along a lateral skirt of said container between said heating base and said closing element, which connecting arm is configured to retain mutually juxtaposed said heating base, said container and said closing element,
    wherein said connecting arm, is revolvingly coupled to said heating base and is configured for the hooking or interlocking engagement, at or near a shaped end thereof, with the said closing element.

2. The device according to claim 1, comprising a pair of connecting arms, said pair of connecting arms being configured to retain mutually juxtaposed said heating base, said container and said closing element, which pair of connecting arms are arranged bilaterally with respect to said container, each extending, in use, along a lateral skirt of said container between said heating base and said closing element.

3. The device according to claim 1, wherein said connecting arm, has a fastening coupling to said closing element.

4. The device according to claim 3, wherein said connecting arm has an articulated coupling with said heating base, which articulated coupling is based upon at least one articulated connection about one or more axes which are substantially horizontal and/or orthogonal to an axis of rotation of said impeller and/or to a longitudinal axis of said container.

5. The device according to claim 3, wherein said fastening coupling comprises, for said connecting arm, a lever pivotally connected at one end to said connecting arm and at the other end to said heating base.

6. The device according to claim 1, wherein said connecting arm has a shaped end portion, configured to establish a connection with said closing element, which connection is a hooking or interlocking coupling.

7. The device according to claim 1, wherein said closing element is in the form of a sealing coupling flange with a mouth of said container.

8. The device according to claim 1, wherein said closing element has one or a pair of engagement elements, each configured to engage a respective hole or seat, of said connecting arm.

9. The device according to claim 1, wherein the lateral skirt of said container has a coupling profile in the form of a groove or knurling.

10. The device according to claim 1, having, at least for said container, a substantially cylindrical geometry.

11. The device according to claim 1, wherein said impeller has an axis of rotation substantially coincident with a longitudinal axis of said container.

12. The device according to claim 1, wherein said impeller is removably fastened to said closing element.

13. The device according to claim 1, wherein said impeller is rotatably coupled to said closing element.

14. The device according to claim 1, wherein said connecting arm is snap-actuated.

15. A device for the preparation of an emulsified hot beverage, in particular a milk-based beverage, comprising:
    a heating base;
    a container of the emulsified hot beverage, configured to be removably supported upon said heating base at a heat exchange surface thereof;
    a closing element of said container, configured to be removably arranged at a mouth of said container;
    an impeller, inserted or insertable in said container and configured to produce an emulsifying effect in the beverage,
    a connecting arm, which connecting arm extends, in use, along a lateral skirt of said container between said heating base and said closing element, which connecting arm is configured to retain mutually juxtaposed said heating base, said container and said closing element,
    wherein said connecting arm, is revolvingly coupled to said heating base and is configured for the hooking or interlocking engagement, at or near a shaped end thereof, with said closing element, and
    wherein said closing element has one or a pair of engagement elements, each configured to engage a respective hole or seat of said connecting arm.

* * * * *